United States Patent
Weigend et al.

(10) Patent No.: US 9,428,848 B2
(45) Date of Patent: Aug. 30, 2016

(54) METHOD FOR MELT SPINNING, STRETCHING, AND WINDING A MULTIFILAMENT THREAD AS WELL AS A DEVICE FOR PERFORMING THE METHOD

(75) Inventors: Helmut Weigend, Radevormwald (DE); Hansjörg Meise, Leichlingen (DE); Detlev Schulz, Remscheid (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 39 days.

(21) Appl. No.: 12/993,177
(22) PCT Filed: May 22, 2009
(86) PCT No.: PCT/EP2009/056220
§ 371 (c)(1),
(2), (4) Date: Jan. 24, 2011
(87) PCT Pub. No.: WO2009/141424
PCT Pub. Date: Nov. 26, 2009

(65) Prior Publication Data
US 2011/0121480 A1    May 26, 2011

(30) Foreign Application Priority Data

May 23, 2008 (DE) .......... 10 2008 024 962
Jun. 4, 2008 (DE) .......... 10 2008 026 738
Aug. 22, 2008 (DE) .......... 10 2008 039 378

(51) Int. Cl.
*D01D 11/06* (2006.01)
*D01D 5/16* (2006.01)
(Continued)

(52) U.S. Cl.
CPC ............... *D01D 11/06* (2013.01); *D01D 5/16* (2013.01); *D01D 10/02* (2013.01); *D01D 10/0436* (2013.01); *D01D 13/02* (2013.01); *B29C 47/0014* (2013.01); *B29C 47/20* (2013.01)

(58) Field of Classification Search
CPC .................................... D01D 11/06

USPC ........................................... 264/103
See application file for complete search history.

(56) References Cited

U.S. PATENT DOCUMENTS 3,511,905 A    5/1970   Horst
6,120,715 A *  9/2000   Weigend ............. 264/103

FOREIGN PATENT DOCUMENTS

CN    1748050 A     3/2006
DE    3146054 A1    5/1982
(Continued)

OTHER PUBLICATIONS

Dr. Ing Olaf Meister, "Give Yarns the Right Character-Draw Rolls and Controls from DIENES," http://www.dienes.net/down/Symposium2005.pdf, retrieved Nov. 18, 2009.
(Continued)

*Primary Examiner* — Larry Thrower
(74) *Attorney, Agent, or Firm* — BainwoodHuang (57) ABSTRACT

A method for melt spinning, stretching, and winding a multifilament thread to form an FDY-yarn as well as a device for performing the method are presented. Hereby, a plurality of filaments are first extruded from thermoplastic melt, cooled to a temperature below the glass transition temperature of the thermoplastic material, and gathered to form a filament bundle without adding a preparation fluid. The filament bundle is then drawn-off at a speed above 1,500 m/min., heated to have a temperature above the glass transition temperature of the thermoplastic material, and stretched at a drawing speed above 4,000 m/min. Preparation of the filament bundle with a preparation fluid and winding the thread to form a spool is then performed. The device has the preparation device arranged in a zone of the thread course between the drawing device and the winding device, in which the thread has a thread-running speed above 4,000 m/min.

17 Claims, 4 Drawing Sheets

(51) Int. Cl.
    *D01D 10/02*     (2006.01)
    *D01D 10/04*     (2006.01)
    *D01D 13/02*     (2006.01)
    *B29C 47/00*     (2006.01)
    *B29C 47/20*     (2006.01)

(56) References Cited

FOREIGN PATENT DOCUMENTS

| | | |
|---|---|---|
| DE | 19503561 A1 | 8/1995 |
| DE | 19958245 A1 | 6/2000 |
| JP | S57205516 A | 12/1982 |
| JP | 60-110914 A | 6/1985 |
| JP | 60-161171 | 10/1985 |
| JP | 2000-136433 | 5/2000 |
| JP | 2001-214325 A | 8/2001 |
| JP | 2002-161432 A | 6/2002 |
| JP | 2003-166142 | 6/2003 |
| JP | 2007009341 A | 1/2007 |
| KR | 1993-0007044 | 10/1993 |
| KR | 2006-0123432 | 12/2006 |
| WO | 2004070092 A | 8/2004 |
| WO | 2007115703 A | 10/2007 |
| WO | 2009141426 | 11/2009 |

OTHER PUBLICATIONS

Japanese Patent Application No. 2011-510957, Office Action mailed Mar. 27, 2013.

Japanese Patent Application No. 2011-510958, Office Action mailed Mar. 27, 2013.

* cited by examiner

METHOD FOR MELT SPINNING, STRETCHING, AND WINDING A MULTIFILAMENT THREAD AS WELL AS A DEVICE FOR PERFORMING THE METHOD

The invention relates to a method for melt spinning, stretching, and winding a multifilament thread to form an FDY-yarn as well as a device for performing the method.

A generic method for melt spinning, stretching, and winding a multifilament thread as well as a generic device for performing the method are known, for example, from DE 31 46 054 A1.

Depending on the degree of orientation of the molecular chains of the polymer material within the thread, it is differentiated between so-called POY-yarns and FDY-yarns when producing synthetic threads. The pre-oriented yarns (POY-yarns) have a pre-oriented, not yet fully drawn structure. Such yarns are preferably further processed in a draw-texturing process. Fully drawn yarns (FDY), in contrast, have an oriented, fully drawn structure. These yarns can therefore be further processed to form an area product without any further treatment.

In order to be able to produce such FDY-yarns in a one-stage process, the freshly extruded filaments, after having been gathered to form a thread, are fully drawn and subsequently wound to form spools. A method for producing an FDY-yarn is illustrated, for example, in DE 31 46 054 A1. First, a plurality of filaments is extruded from a polymer melt, such as polyester or polyamide. The filaments are then cooled to solidify the polymer material and gathered after cooling and humidified with a preparation fluid. The prepared thread is drawn-off and stretched between godets. It is common to heat the thread before stretching, in order to trigger a defined stretching point. For this, the draw-off godet is provided with a heated godet jacket, at the circumference of which the thread is guided having a single wraparound. Due to draw-off speeds that can be above 4,000 m/min., there are only very short contact lengths for heating the thread to a temperature that triggers the stretching point, while having partial wraparounds of the thread at the draw-off godet. Like this, warm drawing, when reaching the glass transition temperature of the yarn material can be achieved. For polyester, for example, this is at a temperature of approx. 85°. The contact length for heating the yarn during partial wraparound at the godet is thus insufficient for obtaining a comprehensive uniform heat-soak of all filaments of the yarn.

The known method and the known device are only partly suitable for performing full warm-drawing of the yarn The alternative method suggested in the publication, in which the thread is guided with multiple wraparounds at the draw-off godet, can only achieve warm-drawing using higher energy and material input at the draw-off godet as well as at the drawing godet.

It is therefore an object of the invention to develop a method for melt spinning, stretching, and winding a thread as well as a device for performing the method of the kind initially mentioned in such a manner, that heating the thread for full stretching is possible with as little energy input as possible.

A further object of the invention is to provide a generic method and a generic device with which a plurality of parallel spun filament bundles are producible in an arrangement as compact as possible.

According to the invention, this object is accomplished by a method as well as by a device for performing the method according to the features described below.

Advantageous developments of the invention are defined by the characteristics and combination of characteristics of the features described below.

The invention is based on the conclusion, that when heating the multifilament thread, the thread material as well as the preparation fluid need to be heated in equally. Prior to heating the prepared thread, the water content of the preparation fluid is first vaporized and extracted from the filament group.

First, substantial reservations arose during the search for a solution. It is commonly known, that a filament bundle being gathered from a plurality of filaments experiences electrostatic charges during each contact with a surface, which leads to uncontrolled expanding of the filament bundle. This effect especially increases with increasing thread speeds. Furthermore, humidifying the filaments with a preparation fluid is mandatory for further treatment of the threads. Hereby it must be ensured, that distribution and adhesion of the preparation fluid to the filaments of the filament bundle occurs in a uniform manner. This method step, however, is difficult to keep under control during high thread speeds.

Despite the many reservations, the invention chose an entirely new approach, in that preparation of the thread is not performed until after stretching. For this, the preparation device is arranged in a zone of the thread course between the drawing device and the winding device, in which the thread has a thread speed of above 4,000 m/min. Like this it was possible, that the freshly extruded filament bundle can be heated and drawn in a dry state after cooling, without adding a preparation fluid.

The invention was also not obvious from the method known from U.S. Pat. No. 3,840,633. With the known method, a freshly extruded filament bundle is drawn-off at low speeds and stretched at a maximum drawing speed of 1,200 m/min. The filament bundle is hereby gathered and drawn-off directly at the circumference of a godet. The known method is thus completely unsuitable, for instance, for securely guiding the filament bundle at draw-off speeds of above 1,500 m/min. Already when running onto the draw-off godet, major spreading apart and thus irregularities in treatment are unavoidable. Due to the open structure, each of the filaments is subjected to friction leading to electric charges as a result of bad conductivity of the filaments. This effect increases all the more, the higher the draw-off speed of the filament is. In addition, it is common to draw off a plurality of filament bundles laterally parallel beside one another from a spinning zone by means of a draw-off godet. With the known method, this should also not be possible, as individual filaments will inevitably jump over when having small thread distances.

With the method according to the invention and the device according to the invention, the filament bundle is first gathered after cooling and then drawn off in an already gathered state by a draw-off device, preferably a draw-off godet, at a draw-off speed in the range above 1,200 m/min, preferably at above 1,500 m/min, so that a drawing speed for drawing the filaments is required in the range above 3,500 m/min, preferably above 4,000 m/min.

After stretching the filament bundle, in order to obtain intensive humidification of the filaments of the filament bundles at very high thread speeds above 3,500 m/min, the variation of the method is especially advantageous in which the filament bundle is prepared in a piece of yarn tensioned between two driven godets. Thread tension within the piece of yarn of the filament bundle can thus be adjusted to adapt to the process step of preparation by setting the circumference speed of the godets.

In order to thereby achieve a uniform distribution of the preparation agent to all filaments of the filament bundle, the filament bundle is preferably guided for preparation at a curved contact area of a perforated plate having fine pores, the bottom side of which is continuously being supplied with the preparation fluid. On the one hand, a strip-like distribution of the filaments at the contact area of the humidification means is achieved like this, and on the other hand, a sufficient contact length at the contact area between the filaments and the humidified surface of the perforated plate can be achieved, so that intensive humidification of the filaments is possible even at very high thread-running speeds of above 4,000 m/min.

For drawing-off and stretching the dry filament bundle at high thread-running speeds, the filament bundle is, according to an advantageous development of the invention, guided having a single wraparound at the circumference of driven godets, the filament bundle being guided at least at the draw-off godet in a circumferential guiding groove. On the one hand, friction between the individual filaments and the godet surface is thus minimized and, on the other hand, cohesion of the filaments in the filament bundle is improved. Another advantage of this variation of the method is, that a plurality of threads are securely guidable at a godet at a short thread distance laterally beside on another.

In order to thereby achieve a uniform distribution of the preparation agent to all filaments of the filament bundle, the filament bundle is preferably guided for preparation at a curved contact area of a perforated plate having fine pores, the bottom side of which is continuously being supplied with the preparation fluid. On the one hand, a strip-like distribution of the filaments at the contact area of the humidification device is achieved like this, and on the other hand, a sufficient contact length at the contact area between the filaments and the humidified surface of the perforated plate can be achieved, so that intensive humidification of the filaments is possible even at very high thread-running speeds of above 4,000 m/min.

For further treatment of the yarn, the thread needs to have sufficient yarn cohesion, usually produced by so-called interweaving knots that develop when mingling the filament bundle. In order to be able to set ideal thread tension for mingling the thread, which is in particular independent of the previous process steps and the following process steps, according to an advantageous development of the invention, the thread is mingled in a piece of yarn being tensioned between two driven godets prior to winding, the mingling producing the amount of at least 10 interweaving knots for every meter of thread length. By adjusting speed differences at the two godets, ideal thread tension for mingling can be thus set. The subsequent process steps, such as winding, can be performed at a winding tension being independent thereof.

In a further especially advantageously variation of the method, guiding the filament bundle during drawing-off and stretching, for example on smooth jacket surfaces of the godets, can be improved by producing a twist at the filament bundle before drawing-off and after gathering the filament bundle. Hereby, it needs to be made sure, that the twist running back in the filament bundle is stopped during the process of gathering, so that guiding the threads after extrusion and during cooling remain unaffected herefrom. The twist advancing in the thread course, though, leads to better cohesion of the filaments within the filament bundle.

The device according to the invention includes the preparation device arranged in a zone of the thread course between the drawing device and the winding device, in which the thread has a thread running speed above 3,500 m/min. The thread can thus be heated during stretching with little energy input to reach a drawing temperature, preferably being above the glass transition temperature of the thread material.

The preparation device is disposed between two driven godets to enable setting an ideal thread tension, by means of which the filament bundle is guided in the zone of the thread course. For this, the godets are associated with single drives, being controllable independently of one another, so that no or a small difference in speeds can be set between the two godets.

In order to ensure continuous supply of the preparation fluid for humidifying the filament bundle, the preparation device disposes of a perforated plate with fine pores for humidifying the filament bundle, being connected at a bottom side with a pressure chamber for supplying a preparation fluid and having a curved contact surface at a top side. Here, especially very thin perforated plates being produced, for instance, by electroforming, are particularly suited.

The device according to the invention preferably includes driven godets for drawing-off and stretching, at which a filament bundle is guidable having single wraparounds, and having at least one draw-off godet including a guiding groove at the circumference for guiding the filament bundle.

With the device according to the invention, heating the filament bundle for reaching a drawing temperature is preferably performed by a heating device being formed by a contact heater and/or a radiant heater and being associated with the drawing device. Using a convector heater would likewise be possible, with which the thread is heated by means of a fluid, for example.

With the device according to the invention, producing yarn cohesion prior to winding the thread is performed by means of a mingling device, being disposed between the preparation device and the winding device, the mingling device being associated with a driven godet at both a feed side and a delivery side, respectively With this, the desired thread tension can be adjusted by controlling the individual drives of the godets.

For performing the variation of the method in which the filament bundle receives a twist, the device according to the invention includes a twister, by means of which a twist to the filament bundles is producible, and being in the thread course downstream of the collective yarn guide. Air nozzles are preferably used as twisters, with which the air stream impacting on the filament bundle causes twisting of the filament bundle.

The method according to the invention as well as the device according to the invention for performing the method are illustrated in the following by means of several embodiments of the device according to the invention with reference to the figures attached, in which FIG. 1 schematically shows a side view of a first embodiment of the device according to the invention for performing the method according to the invention.

Figure 1:
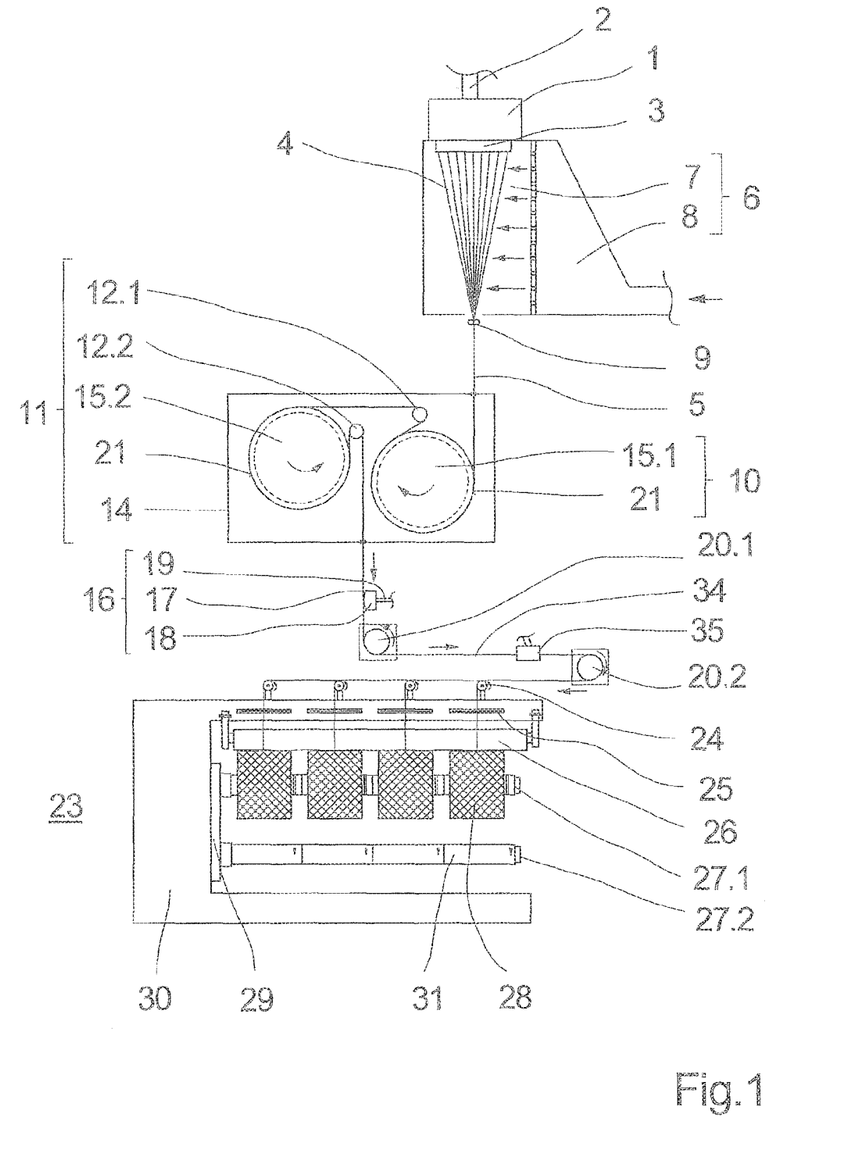
Figure 2:
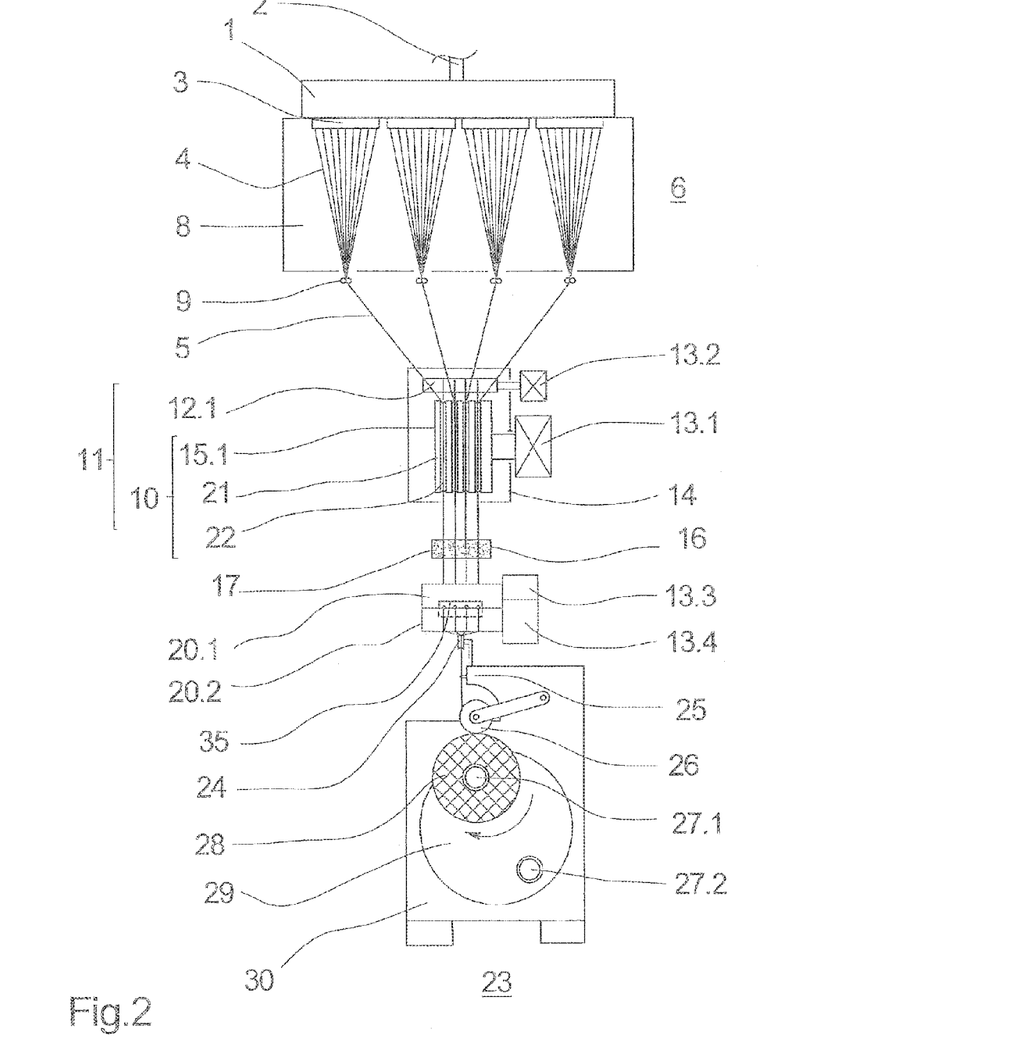
FIG. 2 schematically shows a front view of the embodiment according to FIG. 1

FIGS. 1 and 2 illustrate in a plurality of views of a first embodiment of the device according to the invention for performing the method according to the invention for producing an FDY-yarn. FIG. 1 illustrates the embodiment from a side view and FIG. 2 from a front view. Insofar as no explicit reference is made to any of the figures, the following description applies to both figures.

A heatable spinning head 1 is provided for melt spinning a multifilament thread, including a spinneret 3 with a plurality of nozzle openings at its bottom side and a melt inlet 2 at its top side. The melt inlet 2 is linked to a melt source, for instance an extruder, not shown here. Within the spinning head 1, further melt lead and melt-promoting components are arranged and will not be detailed here.

The Spinning head carries a plurality of spinnerets 3 at its bottom side for simultaneously spinning a plurality of threads laterally parallel beside one another. The subsequent devices and assemblies are further described only by means of a thread course. Basically, each of a total of four threads produced laterally parallel beside one another are treated equally, the number of spinnerets and threads in the embodiment being by way of example. More than four threads can also be thus spun, stretched and wound parallel.

A cooling device 6, being formed by a cooling duct 8 and a blowing device 7, is provided below the spinning head 1. The cooling duct 8 is disposed below the spinnerets 3 in such a way, that the plurality of filaments 4 having been extruded by the spinnerets 3 pass through the cooling duct 8. A cooling air stream can be generated by the blowing device 7 and passed into the cooling duct 8, so that the filaments 4 having been extruded by the spinnerets 3 are cooled in a uniform manner.

A collective yarn guide 7 is provided below the cooling duct 8 for gathering the filaments 4 to form a filament bundle 5. For this, the collective yarn guide 9 is arranged in center below the spinneret 3, so that the filaments 4 are gathered in a uniform manner in the collective yarn guide 9.

A draw-off godet 10 and a drawing device 11 cooperating with the draw-off godet 10 are arranged below the collective yarn guide 9, for drawing off the filament bundle 5 from the spinning zone and subsequently stretching it. The draw-off godet 10 in this embodiment is formed by a driven heating drum 15.1. The heating drum 15.1 includes a heating jacket 21 being heated to have a temperature in the range of 80° C. to 220° C., which is above the glass transition temperature of the respective yarn material.

The illustration in FIG. 2 shows, that the heating jacket 21 of the heating drum 15.1 is provided with a guiding groove 22 for every filament bundle 5, respectively. The filament bundle 5 is guided within the guiding groove 22 at the circumference of the heating drum 15.1 having a partial wraparound. The heating drum 15.1 is hereby driven by means of a drive mechanism 13.2 at a circumference speed being above 1,200 m/min, preferably above 1,500 m/min.

The heating drum 15.1 is associated with a take-off godet 12.1, as is shown in FIGS. 1 and 2. The take-off godet 12.1 is driven by means of a drive mechanism 13.2 at essentially equal circumference speed as the heating drum 15.1. The take-off godet 12.1 is associated with the circumference of the heating drum 15.1 in such a way, that the filament bundle 5 is guided having as large a wraparound as possible, e.g. at a 300° wraparound angle, at the heating jacket 21.

The drawing device 11 includes a second heating drum 15.2 being disposed laterally beside the first heating drum 15.1, as is shown in FIG. 1. The second heating drum 15.2 is likewise linked with a drive mechanism (not shown here), driving the heating jacket 21 at a drawing speed above 3,500 m/min, preferably at above 4,000 m/min. The heating jacket 21 of the heating drum 15.2 is also heated like the heating jacket of the first heating drum 15.1 for being able to perform a relaxation treatment for the filament bundle after stretching. Stretching of the filament bundle 5 is thus performed between the heating drums 15.1 and 15.2.

The heating drum 15.2 is likewise associated with a take-off godet 12.2 at the circumference, being driven via a drive mechanism, not shown here. The circumference speed of the take-off godet 12.2 is in this case equal to the circumference speed of the heating drum 15.2. The take-off godet 12.2 is here also positioned in such a way, that the filament bundle 5 is guided having as large a wraparound as possible at the heating jacket 21 of the second heating drum 15.2.

The heating drum 15.1 and 15.2 as well as both take-off godets 12.1 and 12.2 are disposed within a godet box 14. The filament bundle 5 is guided through an inlet of the godet box 14 and through an outlet of the godet box 14.

A preparation device 16 is disposed below the drawing device 11 in a zone of the thread course between the drawing device 11 and a subsequent winding device 23. The preparation device 16 is hereby held directly at the delivery side of the drawing device 11, the piece of yarn of the filament bundle 5 associated with the preparation device 16 being tensioned between the take-off godet 12.2 and a guiding godet 20.1 being downstream of the preparation device 16. The guiding godet 20.1 is linked with a drive mechanism, so that a difference in speed is adjustable between the take-off godet 12.2 and the guiding godet 20.1.

In this embodiment, the preparation device 16 is formed by a perforated plate 17 having fine pores, being connected at its bottom side with a pressure chamber 18 and having a curved contact surface at its top side, at which the filament bundle 5 is guided having contact. The pressure chamber 18 is connected via a fluid connection 19 to a pressure source, through which a preparation fluid is continuously being supplied to the pressure chamber 18. Such a preparation device is, for example, known from EP 1 590 512, the contents of which are incorporated by reference in their entirety.

A further guiding godet 20.2, being held at a face side of the winding device 23, is provided above the winding device 23. The second guiding godet 20.2 is likewise linked with a drive mechanism. A mingling device 35 is disposed in the tensioned piece of yarn between the guiding godets 20.1 and 20.2, in order to create yarn cohesion in the thread 34 by producing interweaving knots. Thread tension for mingling the thread 34 can hereby advantageously be controlled by a differential speed being set between the guiding godets 20.1 and 20.2.

A winding device 23 is disposed below the guiding godets 20.1 and 20.2. The winding device 23 in this embodiment is formed by a so-called winding turret machine, including a rotatable spindle carrier 29 with two freely protruding winding spindles 27.1 and 27.2. The spindle carrier 29 is mounted in a machine frame 30. The winding spindles 27.1 and 27.2 can be guided alternately in an operating zone for winding a spool and in a changing zone for exchanging the spool. A traversing device 25 and a pressure-exerting roller 26 are provided in the machine frame for winding the thread 34 to form a spool 28. Hereby, the pressure-exerting roller 26 contacts the surface of the spool 28. The traversing device 25 includes a traversing unit for each of the threads, in which the thread is guided passing to and fro to form a cross-wound bobbin. Above the traversing device, a top yarn guide 24 is provided, by means of which thread-feed into the winding position is guided.

In this embodiment, the top yarn guide 24 is formed by freely rotatable deflection rollers, for redirecting the thread running off the guiding godet 20.2 from an essentially horizontal distribution plane to the winding position. Like this, spreading apart of the threads to both winding positions can be avoided, as the threads are commonly guided having a close thread distance at the godets.

In the embodiment illustrated in FIGS. 1 and 2, the spinning head 1 is fed a polymer melt, for instance made of polyester or polyamide, in order to produce a so-called FDY-yarn. Within the spinneret 3, the polymer melt is squeezed under pressure through the nozzle bores being formed on the bottom side of the spinneret 3 in order to extrude a multitude of filaments. The filaments are cooled within the cooling duct 8 to a temperature below the glass transition temperature of the thermoplastic material, so that solidification and pre-orienting occurs at the filaments. After the filaments have cooled, they are gathered to form a filament bundle 5, no preparation fluid being added, though, so that the filaments 4 of the filament bundle 5 are held together without any additional means. After gathering, the filament bundle 5 is then drawn-off in a dry state at a draw-off speed above 1,500 m/min. and delivered to the stretching process.

The draw-off godet is in this embodiment formed by the heating drum 15.1, including a heated heating jacket 21 for heating the filament bundle 5 with the filaments 4 to have a temperature above the glass transition temperature of the thermoplastic material. For this, the heating jacket has a surface temperature in the range of 80° to 220° C. The glass transition temperature of polyester, for example, is in the range of 80° C. In order to obtain full stretching of the filament bundle 5 and hence orientation of the molecular structure of the thread material in the filaments 4, the filament bundle 5 is stretched at a drawing speed above 4,000 m/min. The drawing speed in this embodiment is generated by a second heating drum 15.2, at which an aftertreatment in the form of relaxation is simultaneously performed at the filament bundle 5.

After the filament bundle 5 is fully drawn, a preparation for creating yarn cohesion of the filament bundles 5 is performed and thus the thread 34 is produced. For this, the filament bundle 5 is guided and prepared between two driven godets. Hereby, the filament bundle 5 is guided having a partial wraparound at the curved contact area of the perforated plate with fine pores, at the surface of which a preparation fluid is continuously discharged. Like this, distribution of the preparation fluid within the filament bundle 5 can be achieved in a uniform manner, the filament bundle 5 being guided at the contact area having a strip-like shape. Like this, all filaments 4 can be humidified the same.

There is also the option to homogenize the preparation agent by blowing onto the filament bundle 5 or by applying an entirely different means to the filament bundle, such as a spin finish applicator.

Before winding the fully drawn thread 34, yarn cohesion is fixed by means of a mingling device 35, in which a plurality of interweaving knots in the thread 34 are produced. A minimum amount of 10 knots for every running meter of the thread length is produced in the FDY-yarn like this.

The method according to the invention and the device according to the invention are especially characterized by low energy input for performing stretching of the threads.

Like this, the dry filament bundle can be heated to a drawing temperature in a shorter time and with less energy, even during common high production speeds of up to and above 6,000 m/min.

Figure 3:
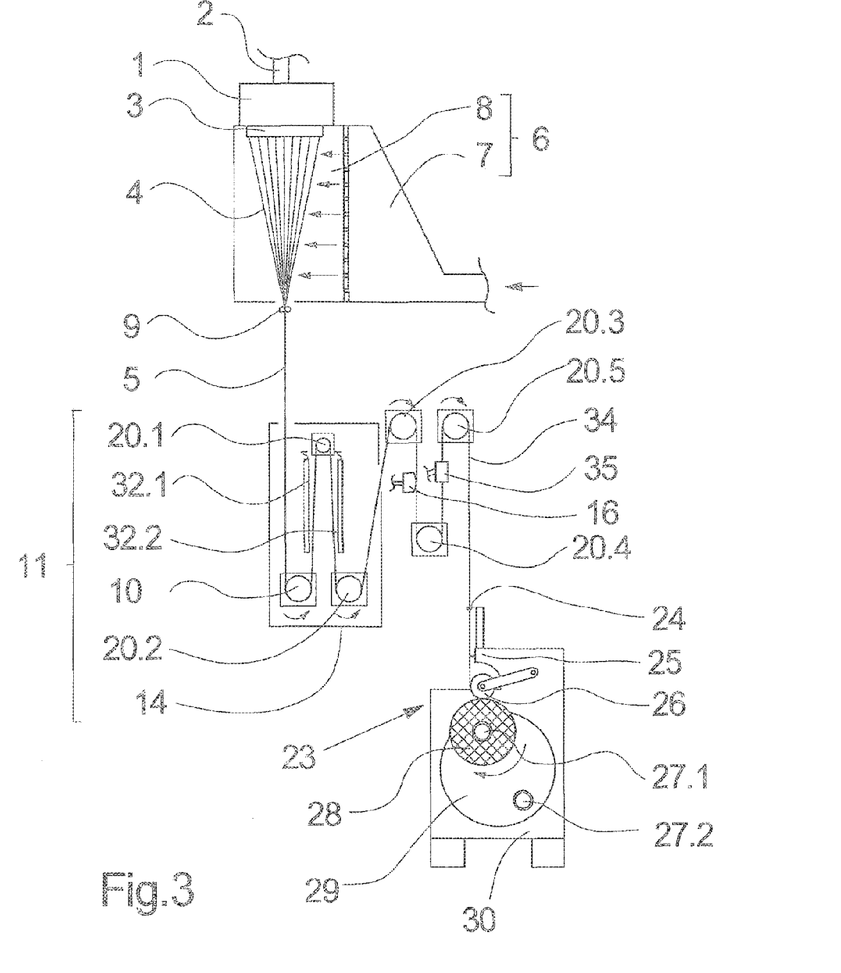
FIG. 3 schematically shows a front view of a further embodiment of the device according to the invention for performing the method according to the invention.

FIG. 3 schematically shows a further embodiment of the device according to the invention for carrying out the method according to the invention for producing a fully drawn yarn to form an FDY-yarn. The embodiment is shown in a front view, only one thread course being illustrated. It is also common here, to spin, stretch, and wind a plurality of threads laterally parallel beside one another.

The entire unit shown in FIG. 3 essentially differs in the drawing device 11. The devices for melt spinning the filaments as well as the devices for winding the multifilament thread are essentially identical to the aforementioned embodiment according to FIGS. 1 and 2, so that at this point it is referred to the aforementioned description and only the differences are described in the following.

A system with a plurality of guiding godets 10, 20.1, 20.2 is provided below the cooling duct 8 for drawing-off and stretching the filament bundle 5. The godets 10, 20.1, 20.2 of the drawing device 11 are disposed within a godet box 14 below the cooling duct 8. The drawing device 11 includes a draw-off godet 10 being directly downstream of the collective yarn guide 9, for drawing off the filament bundle 5 from the spinning zone. The draw-off godet 10 is followed by two additional guiding godets 20.1 and 20.2. Each of the godets 10, 20.1, and 20.2 includes an own drive mechanism, so that differences in speed between the godets can be set. The filament bundle 5 wraps around the godets 10, 20.1 and 20.2 at a wraparound angle of essentially approx. 180°, a heating zone each being formed between the draw-off godet 10 and the guiding godet 20.1 as well as the guiding godet 20.2 and the guiding godet 20.1, respectively. For this, the heating zones are associated with two radiant heaters 32.1 and 32.2. The radiant heaters 32.1 and 32.2 can, for example, be formed by infrared radiant members, by means of which the filament bundle 5 is heated without contacting only by heat radiation to reach a temperature above the glass transition temperature of the respective thread material. Stretching the filament bundle 5 is hereby advantageously performed between the draw-off godet 10 and the guiding godet 20.1 However, it is also possible to perform stretching of the filament bundle 5 in two steps, so that a first partial stretching occurs between the draw-off godet 10 and the guiding godet 20.1 and a second partial stretching occurs between the godet 20.1 and the godet 20.2.

After stretching, the filament bundle 5 is guided over the subsequent guiding godets 20.3, 20.4 and 20.5. Each of the guiding godet 20.3 to 20.5 includes a drive mechanism, so that thread tension of the pieces of yarn of the filament bundle 5 tensioned between the godets is adjustable.

A preparation device 16, by means of which the filament bundle 5 is humidified, is disposed in the piece of yarn between the guiding godet 20.3 and the guiding godet 20.4 The preparation device 16 is identical to the embodiment according to FIGS. 1 and 2, so that no further explanation is given at this point.

A mingling device 35 is disposed between the guiding godets 20.4 and 20.5 in the tensioned piece of yarn for mingling the thread 34 and thereby improving yarn cohesion in the thread by producing interweaving knots. The thread 34 is then guided from the guiding godet 20.5 to the winding device 23, in which the thread 34 is wound to form a spool 28. In this embodiment, the thread 34 is distributed from a vertical distribution to the individual winding positions. When guiding a plurality of threads in a parallel manner, they would insofar be spread apart in an axial direction towards the winding device after having run off the guiding godet 20.5, and be distributed to the individual winding positions.

The embodiment illustrated in FIG. 3 is likewise suited for performing the method according to the invention for producing an FDY-yarn. The godets for drawing-off, stretching and guiding the filament bundle and the thread each have partial wraparounds, where especially the draw-off godet as well as the guiding godets of the drawing device can comprise a circumferential guiding groove for guiding the filament bundle.

Figure 4:
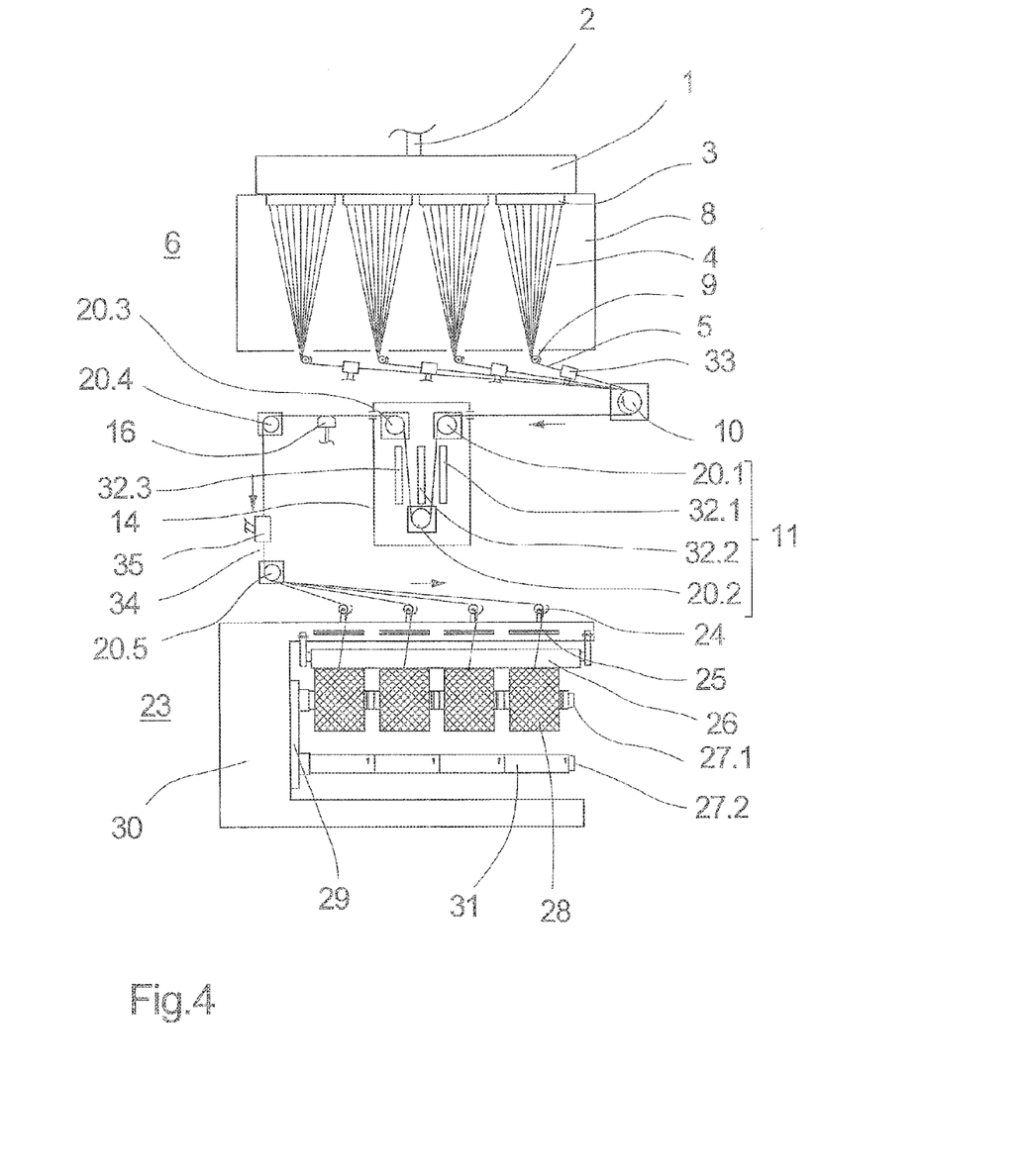
FIG. 4 schematically shows a side view of a further embodiment of the device according to the invention for performing the method according to the invention.

FIG. 4 schematically shows a side view of a further embodiment of the device according to the invention for carrying out the method according to the invention. The embodiment according to FIG. 4 is essentially identical to the embodiment according to FIG. 3, so that the following only describes the differences and otherwise refers to the aforementioned descriptions.

In the embodiment illustrate in FIG. 4, the spinnerets held at the spinning head 1 are held in a row-like arrangement being parallel to the winding spindles 27.1 and 27.2 of the winding device 23. In order to obtain an arrangement of the entire apparatus as compact as possible, after extrusion, the filament bundles 5 are drawn off by a draw-off godet 10 being disposed laterally beside the spinnerets 3. In this case, the collective yarn guides 9 are formed by deflection rollers including a collecting groove at their circumference. The draw-off godet 10 preferably formed having a heated guiding jacket, so that the filament bundle is partially heated. Here also, the heated godet jacket of the draw-off godet 10 includes guiding grooves, which the filament bundle 5 runs onto.

A twister 33 for creating a twist in the filament bundle 5 is disposed in the piece of yarn tensioned between the collective yarn guides 9 and the draw-off godet 10. The twister 33 is preferably formed by air nozzles creating an air stream that produces a turning moment at the filament bundle 5.

In this embodiment, the drawing device 11 is downstream of the draw-off godet 10. The drawing device is formed by a plurality of guiding godets 20.1, 20.2, and 20.3 being arranged within a godet box 14. A plurality of radiant heaters 32.1, 32.2, and 32.3 are disposed between the free guide paths for heating the filament bundle 5. The embodiment according to FIG. 4 of the drawing device 11 is insofar especially suited for performing full stretching between the first guiding godet 20.1 and the second guiding godet 20.2. An aftertreatment in the form of relaxation can be performed in the piece of yarn of the filament bundle 5 tensioned between the guiding godets 20.2 and 20.3.

The drawing device 11 is followed by two further guiding godets 20.4 and 20.5, a preparation device 16 being upstream of the guiding godet 20.4. The preparation device 16 is formed identical to the aforementioned embodiment, so that the filament bundle 5 is prepared with a preparation fluid after stretching, commonly consisting of an oil/water emulsion.

For improving yarn cohesion, a plurality of interweaving knots is produced at the thread 34 by means of the mingling device 35. The thread 34 is then guided via the guiding godet 20.5 to the winding device. The winding device is formed identically to the embodiment according to FIGS. 1 and 2, so that no further explanation is given at this point.

The embodiment illustrated in FIG. 4 is especially suited for enabling performing the method according to the invention while having a very compact arrangement of the devices.

LIST OF REFERENCE NUMERALS

1 Spinning head
2 Melt inlet
3 Spinneret
4 Filaments
5 Filament bundle
6 Cooling device
7 Blowing device
8 Cooling duct
9 Collective yarn guide
10 Draw-off godet
11 Drawing device
12 Run-off godet
13.1, 13.2, 13.3 Drive mechanisms
14 Godet box
15.1, 15.2 Heating drum
16 Preparation device
17 Perforated plate
18 Pressure chamber
19 Fluid connection
20.1, 20.2 Guiding godet
21 Heating jacket
22 Guiding groove
23 Winding device
24 Top yarn guide
25 Traversing device
26 Pressure-exerting roller
27.1, 27.2 Winding spindle
28 Spool
29 Spindle carrier
30 Machine frame
31 Winding tube
32.1, 32.2 Radiant heaters
33 Twister
34 Thread/Yarn
35 Mingling device

The invention claimed is:

1. A method for melt spinning, drawing and winding a multifilament thread to form a Fully Drawn Yarn, the method performed in an apparatus having (i) a yarn guide, (ii) a drawing device, (iii) a preparation device, and (iv) a winding device, which are arranged in an order in which the drawing device is disposed after the yarn guide and before the preparation device from a process standpoint, and in which the preparation device is disposed after the drawing device and before the winding device from the process standpoint, the method comprising:

extruding a plurality of filaments from thermoplastic material;

cooling the filaments to a temperature below the glass transition temperature of said thermoplastic material;

in the yarn guide, after cooling the filaments, gathering the filaments to form a filament bundle without adding any fluid;

in the drawing device which is disposed after the yarn guide and before the preparation device, drawing-off the filament bundle at a draw-off speed in the range above 1,500 m/min;

in the drawing device which is disposed after the yarn guide and before the preparation device, heating the filament bundle to have a temperature above the glass transition temperature of the thermoplastic material and drawing the filament bundle at a drawing speed in the range above 3,500 m/min;

in the preparation device which is disposed after the drawing device and before the winding device, preparing the filament bundle with a preparation fluid; and in the winding device, winding said thread to form a spool.

2. Method according to claim 1, wherein the filament bundle is prepared in a piece of yarn tensioned between two driven godets.

3. Method according to claim 2, wherein the filament bundle is guided at a curved contact surface of a perforated plate having fine pores, at the bottom side of which the preparation fluid is being continuously supplied.

4. Method according to claim 1, wherein for drawing-off and drawing, the filament bundle is guided having single wraparounds at the circumference of driven godets, the filament bundle being guided in a circumferential guiding groove at least one draw-off godet.

5. Method according to claim 1, wherein the filament bundle is heated by contacting a heated surface and without contact by radiant heat or by convection.

6. Method according to claim 1, wherein the thread is mingled in a piece of yarn tensioned between two driven godets prior to winding, and in that the mingling creates an amount of at least 10 interweaving knots for every meter thread length.

7. Method according to claim 6, wherein a thread tension for mingling is created in the piece of yarn of the thread by adjusting a differential speed at both godets.

8. Method according to claim 1, wherein a twist is created at the filament bundle after gathering and prior to drawing-off the filament bundle.

9. Method according to claim 1, wherein the filament bundle is heated by contacting a heated surface.

10. Method according to claim 1, wherein drawing the filament bundle at a drawing speed in the range above 3,500 m/min includes drawing the filament bundle at a drawing speed in the range above 4,000 m/min.

11. Method according to claim 1 wherein the yarn guide is constructed and arranged to output the filament bundle in a freshly extruded dry state; and wherein drawing-off the filament bundle at the draw-off speed includes:

in the drawing device, drawing the filament bundle in the freshly extruded dry state prior to delivering the filament bundle to the preparation device.

12. Method according to claim 11 wherein drawing the filament bundle in the freshly extruded dry state prior to delivering the filament bundle to the preparation device includes:

performing a warm stretching operation which heats the filament bundle in the freshly extruded dry state above the glass transition temperature of the thermoplastic material.

13. Method according to claim 12 wherein preparing the filament bundle with the preparation fluid includes:

in the preparation device, humidifying the filament bundle in the freshly extruded dry state.

14. Method according to claim 1 wherein the acts of drawing-off the filament bundle at the draw-off speed in the range above 1,500 m/min and drawing the filament bundle at the drawing speed in the range above 3,500 m/min are performed after performing the acts of extruding the filaments, cooling the filaments, and gathering the filaments, and wherein the act of preparing the filament bundle with the preparation fluid is performed after performing the acts of drawing-off the filament bundle at the draw-off speed in the range above 1,500 m/min and drawing the filament bundle at the drawing speed in the range above 3,500 m/min.

15. Method as in claim 14 wherein no fluid is added to the filaments or the filament bundle until after performing the acts of drawing-off the filament bundle at the draw-off speed in the range above 1,500 m/min and drawing the filament bundle at the drawing speed in the range above 3,500 m/min.

16. Method for melt spinning, drawing and winding a multifilament thread to form a Fully Drawn Yarn, the method comprising:

(A) extruding a plurality of filaments from thermoplastic material;

(B) subsequently to extruding said plurality of filaments, cooling the filaments to a temperature below the glass transition temperature of said thermoplastic material;

(C) subsequently to cooling said filaments, gathering the filaments to form a filament bundle without adding any fluid;

(D) subsequently to gathering said filaments to form said filament bundle, drawing-off the filament bundle;

(E) subsequently to drawing-off said filament bundle, heating the filament bundle to have a temperature above the glass transition temperature of the thermoplastic material and drawing the filament bundle;

(F) subsequently to heating and drawing said filament bundle, preparing the filament bundle with a preparation fluid; and (G) subsequently to preparing said filament bundle, winding said thread to form a spool, wherein no fluid is added to the filaments or the filament bundle until after performing the act of drawing the filament bundle in step (E).

17. Method as in claim 16, wherein said drawing-off the filament bundle in step (D) occurs at a draw-off speed in the range above 1,500 m/min; and wherein said drawing of the filament bundle in step (E) occurs at a drawing speed in the range above 3,500 m/min.

* * * * *